United States Patent [19]

Cawley et al.

[11] 4,438,473
[45] Mar. 20, 1984

[54] POWER SUPPLY FOR AN INTRINSICALLY SAFE CIRCUIT

[75] Inventors: James C. Cawley, Venetia; Michael D. DiMartino, Library; Thomas J. Fisher, Munhall; Roger L. King; Marcus H. Uhler, both of Pittsburgh, all of Pa.

[73] Assignee: The United States of America as represented by the Secretary of the Interior, Washington, D.C.

[21] Appl. No.: 285,247

[22] Filed: Jul. 21, 1981

[51] Int. Cl.³ .............................................. H02H 3/08
[52] U.S. Cl. ...................................... 361/18; 361/74; 361/93; 361/101
[58] Field of Search ...................... 361/18, 31, 55, 57, 361/71, 72, 74, 75, 93, 98, 100, 101, 111

[56] References Cited

U.S. PATENT DOCUMENTS

| 2,842,720 | 7/1958 | Huston | 361/111 |
| 3,051,852 | 8/1962 | Mintz et al. | 361/100 |
| 3,496,415 | 2/1970 | Ruthenberg et al. | 361/57 |
| 3,573,553 | 4/1971 | Mietz | 361/100 X |

Primary Examiner—Harry E. Moose, Jr.
Attorney, Agent, or Firm—Thomas Zack; Donald A. Gardiner

[57] ABSTRACT

An intrinsically safe power supply employing a binary current interrupter connected between the power source and the electrical load. Normally the load is situated in a potentially dangerous environment, like a coal mine, and the intrinsically safe power supply at a safe remote location, e.g., on the earth's surface. The interrupter has a pass and switching transistor, current sensor, gating circuitry, a flip-flop switch, and means to delay the turning on of the transistor—but not its turning off. If an overcurrent or overvoltage condition is sensed between the input and output of the intrinsically safe power supply, load current will cease to flow. In normal operation, only the current interrupter pass transistor will open. A reset signal from an oscillator internal of the interrupter may be used to reset the flip-flop after actuation or upon its initial setting, thereby causing the flow of power into the load.

4 Claims, 8 Drawing Figures

FIG 4.

POWER SUPPLY FOR AN INTRINSICALLY SAFE CIRCUIT

BACKGROUND OF THE INVENTION

The invention disclosed herein is a power supply employing a current interrupter actuated by the detection of a fault.

DESCRIPTION OF THE PRIOR ART

The problem which prompted the making of this invention was to safely supply electrical energy to a potentially explosive atmosphere. More specifically, it was to transmit electrical energy over long lengths of cables to a load in an underground coal mine with an intrinsically safe power supply. It sought to supply this power with both a high voltage and high current, e.g., an output of about 0.8 amp and 20 volts into a 6000 foot long cable supplying a mine load.

The prior art has provided many types of devices which are intrinsically safe. Some have used a resistor-type of current or voltage limiter. These present a problem when their performance is considered along with the environment in which the are designed to operate. If the environment contains gases—like methane—which could easily be ignited by excessive heat or sparks then, from a safety viewpoint, the selection of useable devices becomes very limited. To be ruled out are devices which have a current limiter which allows load current to flow under fault conditions which may heat up a very thin strand of wire to pose a thermal ignition threat.

In addition to the dangers presented by the possibility of ignition, most of the prior art uses devices with a slow response time to circuit fault conditions. Included in this category are current limiters with pass transistors which allow excessive currents to pass for more than a few tens of microseconds before they react.

Still another type of approach to provide an intrinsically safe output for a power supply is to use a zener diode barrier. One problem with this type of barrier is that being resistive in nature, its use is restricted to low power (less than 500 mw) applications and its use as a device for supplying power to operate devices is not practical. Uses of zener diode barriers are generally restricted to low power signalling applications.

An electronic crowbar has also been used to prevent high voltage signals from reaching a load. These crowbars—silicon controlled rectifiers with supporting "turn on" circuitry—are located at the output of the power supply and function to short the output to ground upon a specified voltage. The problems presented by these types of circuits include: tolerance problems; the long response time involved, and the drawback of having to switch off the power supply to return the system back to normal. Electronic crowbars alone are not sufficient to prevent ignitions at the power levels in question.

Either the crowbar circuit or the zener diode barrier may be used in conjunction with a fuse. However, the slow response time of the fuse only allows it to protect the zener diode or crowbar circuit and not the load. Response time of barrier circuitry is not fast enough to prevent ignitions in methane atmospheres.

In contrast to the foregoing, the binary nature of the current interrupter portion of the present invention has several advantages. During its off mode, no energy is delivered to the load thereby eliminating it as potential source of ignition. It may be controlled remotely by an additional input into the interrupter's OR gate. The state of the flip-flop within the interrupter may be used to directly indicate an overcurrent condition in the load. It uses a faster response time to provide higher current and voltage values to intrinsically safe circuits than have been previously achieved. Adjustable trip point levels allow closer adjustment to dangerous voltage levels than has been possible with the nominal and temperature tolerances of the prior art. The slow turn on feature of the current interrupter permits it to function as a fail-safe feature with specific values of capacitance. Hence, if more capacitance than specified is connected to the current interrupter, it will not energize the load. This is very important because capacitance stores energy which can ignite a potentially explosive atmosphere.

The current interrupter circuit is preceded by an active voltage regulator stage and an active current source to limit the flow of energy from the driving power source, which is not intrinsically safe. These elements, an active current source, voltage regulator, and current interrupter, when used in conjunction, can provide a unique and novel circuit arrangement which can supply intrinsically safe power at 20 Vdc and 0.8 ampere to a mine load.

The power source described herein is subject to approval by the Mine Safety and Health Administration (MSHA) of the U.S. Department of Labor according to their specified test procedures. The procedures call for a 50% safety factor to be used during the testing of a device to establish its intrinsic safety qualities. Two faults are intentionally introduced into the device by the MSHA investigators and the device is operated to deliver 1.5 times the operational voltage and current ratings while being tested in a 8.3% methane-air atmosphere. The inventors have conducted unofficial tests of the power source under these conditions with successful results, i.e., no ignitions of the methane-air atmosphere when operated at 25 Vdc and 1 ampere. These test conditions will be again applied by MSHA in its testing program for an experimental usage permit.

SUMMARY OF THE INVENTION

An intrinsically safe power supply with a current interrupter connected between a nonintrinsically safe power supply and an electrically operated load. The interrupter has a voltage sensing network, a pass transistor, and control circuits to binary operate the interrupter so that it is either OFF or ON. A reset signal turns a flip-flip within the interrupter back on after the interrupter has been turned off by the detection of a fault or when the interrupter is being turned on. This interrupter can detect two types of circuit faults. One is an overcurrent fault caused either by a short on the output of the interrupter or a short in the load. The other detectable fault is an excessive voltage at the input to the interrupter. The interrupter circuit is preceded by active current and voltage regulation circuits and electronic overvoltage crowbar circuits. In one embodiment, the intrinsically safe power supply is used to control the flow of power to an intrinsically safe mine monitoring system.

DESCRIPTION OF THE DRAWINGS

FIG. 6A is a graphical representation for the output voltage characteristics versus load current of the FIG. 5 circuit limiter.

Some description of the present invention and background material relating to the system for which it was developed were first made available to the public in a paper distributed at the West Virginia University Coal Mine Electrotechnology Conference held at Morgantown, West Virginia, on July 30, 1980, to August 1, 1980. The particular paper was entitled *Research to Develop an Intrinsically Safe Monitoring System for Coal Mines* authored by two of the inventors herein, namely Thomas J. Fisher and Marcus Uhler. As pointed out in that paper, the research was directed to developing an uninterruptable intrinsically safe power supply located on the surface powering intrinsically safe sensors underground over a dedicated trunk cable to provide for a system that could be used at all locations in a coal mine and at all times, even in an emergency when mine power is shut off. Except for the intrinsically safe power suppy, the components used in the monitoring system are commercially available.

The immediate problem was to transmit safe electrical energy over long lengths of cables (approximately 6,000 feet) to a load located in the underground coal mine. No intrinsically safe power supply existed which could provide the load currents of 0.8 amperes and 20 volts. As pointed out in the discussion of the prior art, many of the current or voltage circuits which limit power sent to the load have severe safety or performance drawbacks when used underground.

Figure 1:
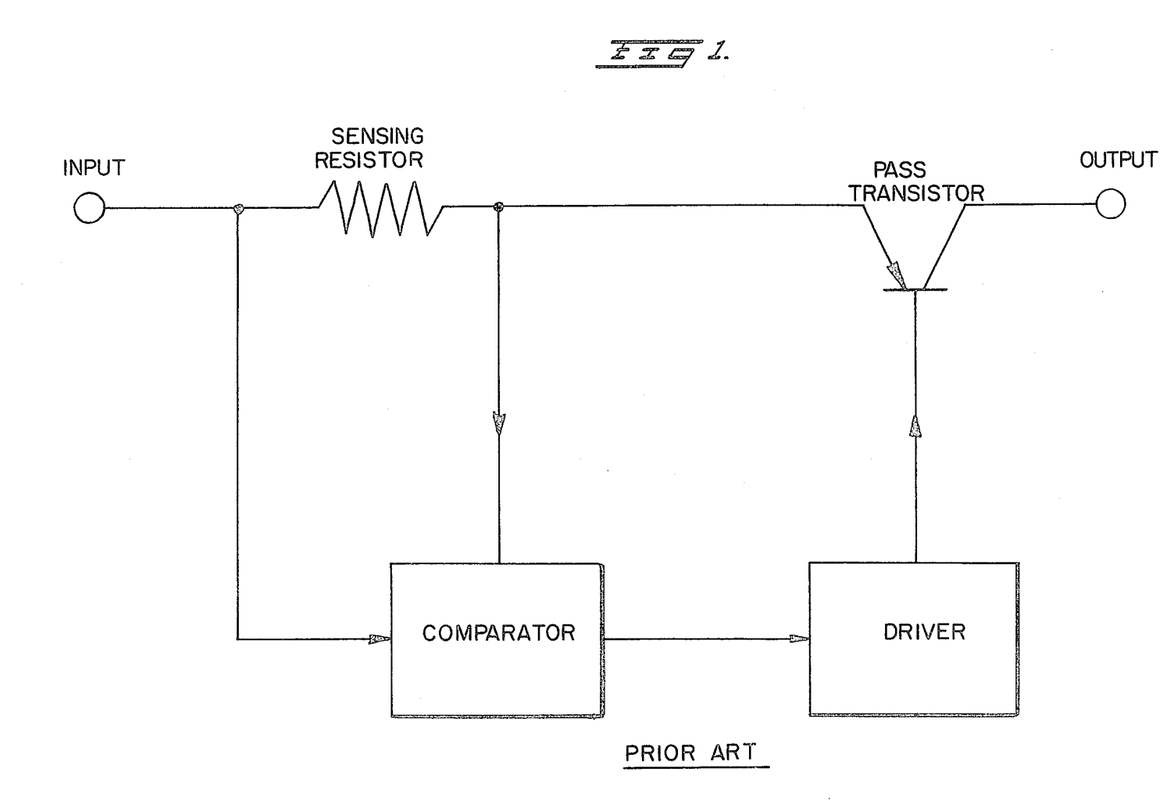
FIG. 1 is a block diagram for a prior art circuit limiter.
Figure 2:
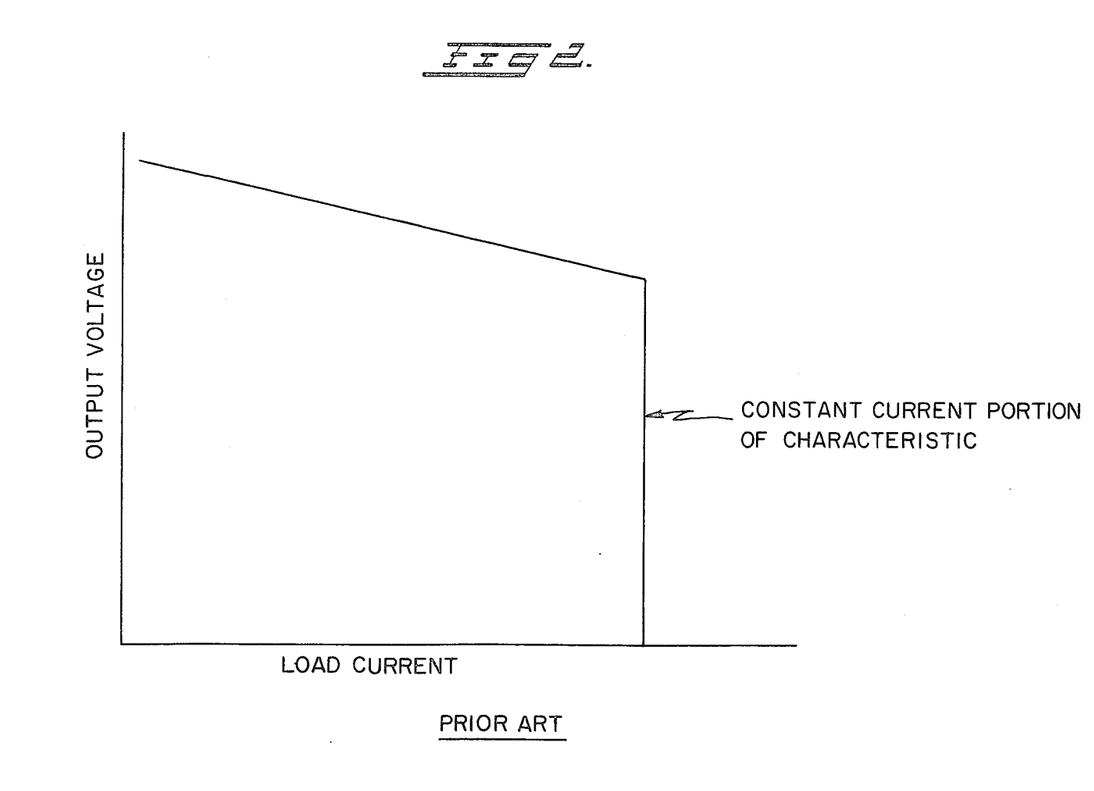
FIG. 2 is a graphical representation for the output voltage and load current of the FIG. 1 limiter circuit.

FIGS. 1 and 2 relate to a typical prior art current limiter and its voltage-current characteristcs. In FIG. 1, the circuit limiter is connected between the power supply and the load. The limiter functions, in the event of a short in the load, to limit the current to a safe level. At the maximum current level, the same limiter acts as a constant current generator. Two drawbacks of major significance are presented by this limiter. One is that thermal ignition could result at some fault conditions, and the other is the slow response time of the limiter. For example, if some current was to flow, a wire could heat up becoming a source of thermal ignition for the explosive atmosphere. The FIG. 1 pass transistor must be of the relatively large power type due to the operating principle of the limiter: of sensing the voltage level across the sensing resistor and comparing that level, and if above a preestablished level, driving—via the driver—the base of the pass transistor off. Such a transistor is inherently slow in reacting, and as such, it could pass excessive current for too long a period of time before it reacts. FIG. 2 plots the typical output voltage of the FIG. 1 circuit limiter against the current being supplied to the load.

The output voltage shown in FIG. 2 remains relatively constant until the predetermined trip level is reached. At that point the output decreases rapidly with small increases in output current. However, even under short circuit load conditions, it can be seen that load current will flow. This can present a hazardous situation if the short circuit output current is allowed to heat small wire strands in the explosive atmosphere. It is obvious that this is not the safest way to limit the output power.

Figure 3:
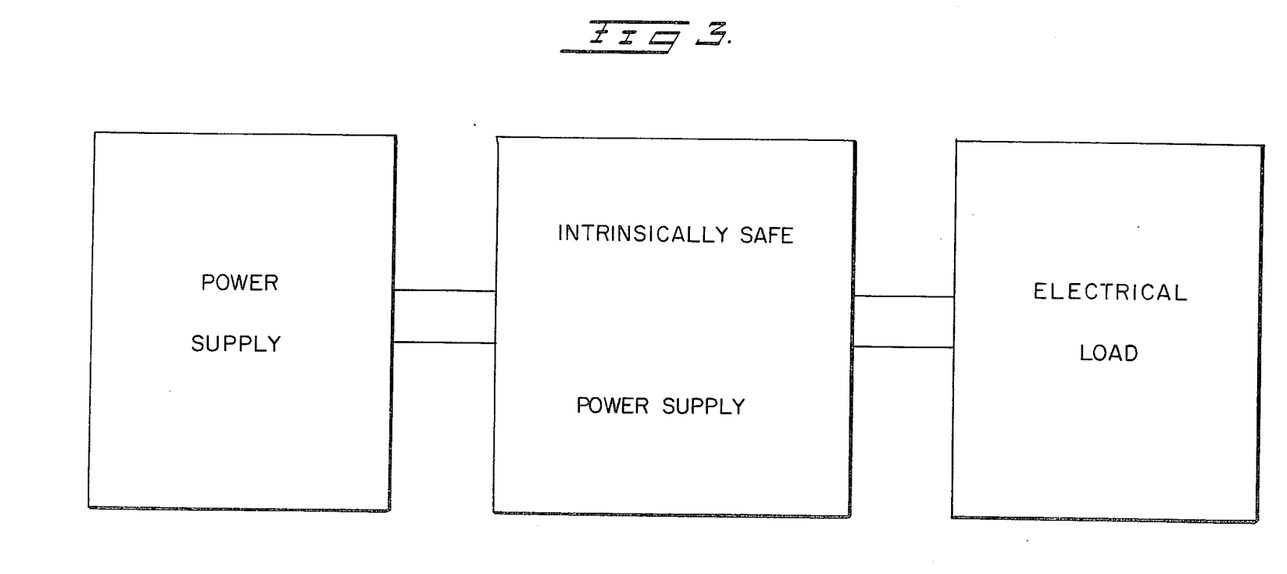
FIG. 3 is a block circuit diagram for the system useable with the invention herein involved.
Figure 4:
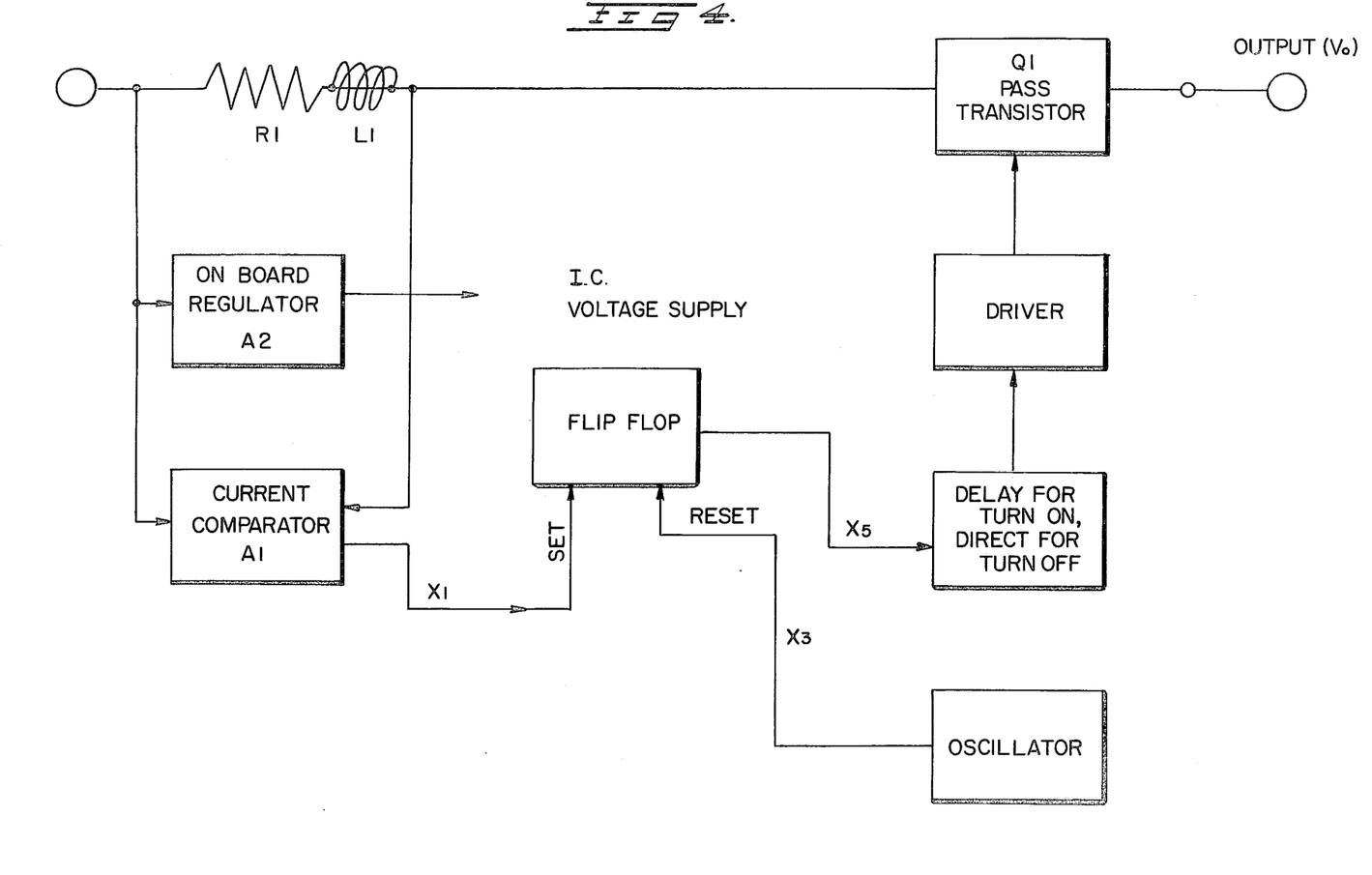
FIG. 4 is a block circuit diagram for the preferred embodiment of the FIG. 3 circuit interrupter.

FIG. 3 shows, in block diagram format, the intrinsically safe power supply forming our invention connected between a conventional regulated power supply and the electrical load in a mine or other potentially explosive atmosphere. The block diagram of FIG. 4 depicts the FIG. 3 intrinsically safe power supply in greater detail. Like the circuit limiter of FIG. 1, our invention shown in FIG. 4 has a sampling network consisting of resistor $R_1$, inductor $L_1$, and a pass transistor $Q_1$. Unlike the prior art, we employ control circuits in the interrupter which provide for its binary operation (either OFF or ON). Normally, when the transistor $Q_1$ is operating, it is saturated and fully ON. The input d.c. voltage level $V_G$ is adjusted to provide for the proper output voltage level $V_o$. Voltage drops occur across the sampling network and transistor $Q_1$. The desired input and output voltages are obtained by compensating for these two voltage drops. As shown, the FIG. 4 circuit also includes an on board voltage regulator network; a current comparator (CC) circuit; a flip-flop (FF) circuit actuated by a signal from the current comparator; an oscillator to supply a reset signal to the FF circuit; a delay circuit to delay the turn on and a bypass circuit for rapid turn off, and a driver connect to the delay/bypass circuit at its input and outputted to the pass transistor.

Referring to both FIGS. 4 and 5, the operation of the current interrupter circuit will be explained. The letter Q represent transistors in FIG. 5; the letters C capacitors; the letters R resistor, and the letter D diodes. During normal operation, the output signal ($X_1$) of the CC circuit and the output signal $X_5$ of the FF circuit are low. Transistors $Q_2$ and $Q_5$ (see FIG. 5) are turned off and transistors $Q_1$ and $Q_4$ are turned on. During this time, the oscillator continues to supply a reset signal pulse $X_3$ to the input of the FF circuit. This reset signal provides the means to turn the current interrupter back on after it has been turned off by the detection of a fault or when the interrupter is first turned on. Signal $X_5$ from the FF circuit is delayed on its way to transistor $Q_1$ when the interrupter is initially turned on which means the output voltage $V_o$ does not immediately rise to its nominal voltage. The voltage slowly rises to its nominal value to permit the operation of the interrupter with capacitive loads. This slow (approximately 1 millisec.) turn on feature is very desirable since capacitive loads initially perform as a short circuit and, as such, would not permit the current interrupter to rapidly turn on.

Chronologically the sequence of operation is as follows: (1) all transistors are off; (2) the output signal $X_5$ from the flip-flop is low; (3) capacitor $C_2$ (see FIG. 5), connected to transistors $Q_2$ and $Q_3$, is charged with a time constant determined by the product of resistor $R_9$ and capacitor $C_2$; (4) as the capacitor $C_2$ charges transistor $Q_3$, whose base is connected thereto, begins to turn on; (5) as transistor $Q_3$ turns on, transistor $Q_4$ also turns on which in turns acts to begin to turn on pass transistor $Q_1$ and the output voltage $V_o$ starts to rise, and (6) once capacitor $C_2$ is fully charged, transistor $Q_3$ becomes fully turned on, which fully turns on transistor $Q_4$, which turns on transistor $Q_1$—raising the output voltage $V_o$ to its nominal value.

Figure 5:
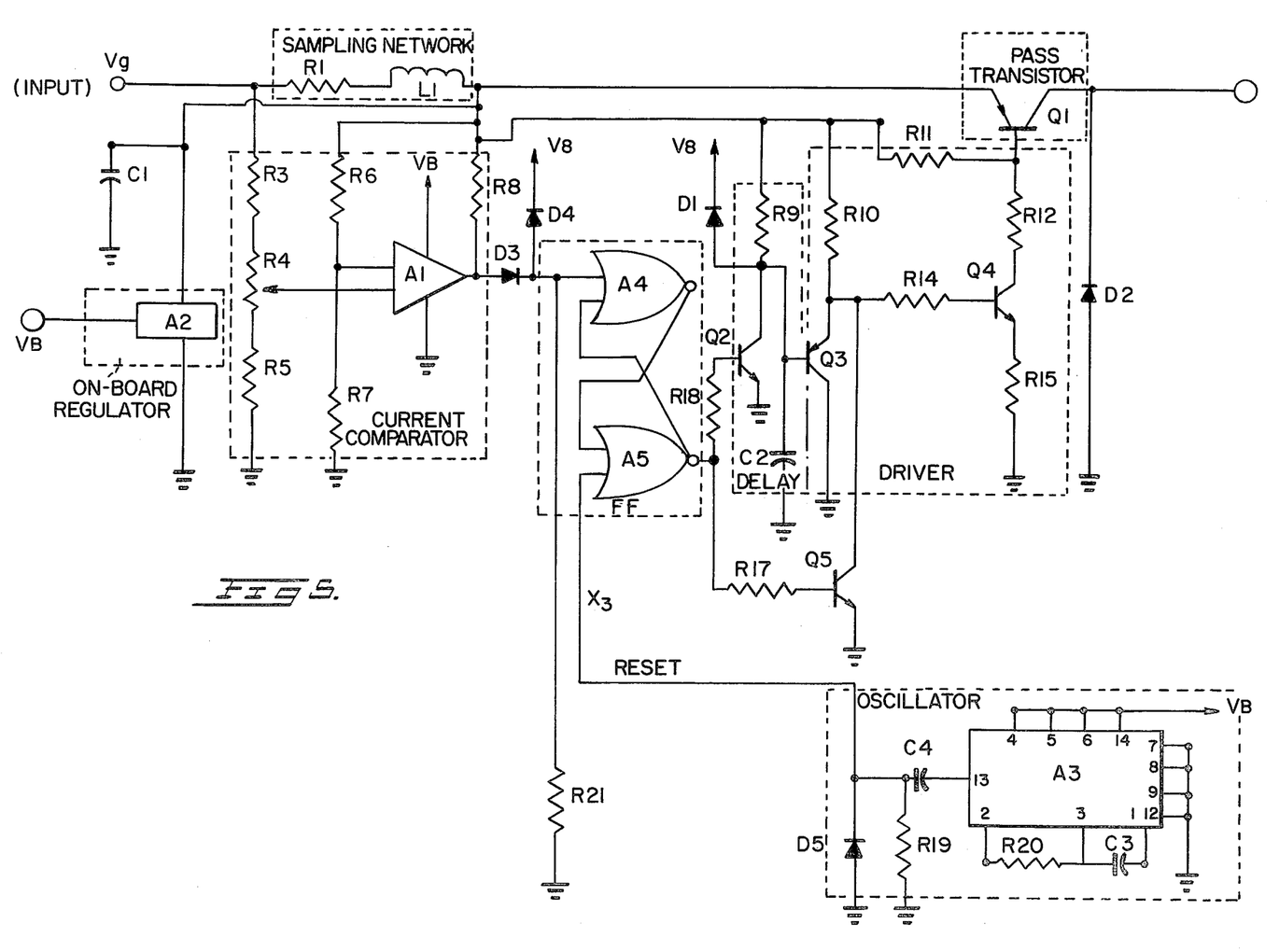
FIG. 5 is a circuit diagram of the FIG. 4 circuit interrupter.

The current interrupter of FIGS. 4 and 5 can detect two types of electrical faults. These are d.c. overcurrent faults and excessive rates of rise of the load current. The d.c. overcurrent condition may arise from a direct short on the output of the current interrupter or a short in one of the elements of the load. This d.c. current rise is detected as a rise in voltage across the fail-safe sampling network having resistor $R_1$ and inductor $L_1$. Two voltage divider networks (see FIG. 5) composed of resistors $R_3$, $R_4$, and $R_5$ in one network, and $R_6$ and $R_7$ in the other, supply voltage input signals proportional to the load current through the sampling network to the plus and minus inputs of the comparator $A_1$. When the set point, determined by adjusting resistor $R_4$, is exceeded, the output of the comparator switches from low to high. This high output signal from the comparator is then used as the input to the SET input of the flip-flop $A_4$ causing it to switch from a low to a high output signal. This high output signal from the FF circuit causes transistor $Q_2$ to be turned on which shorts out capacitor $C_2$. Also, transistor $Q_5$ is turned on which takes the base of transistor $Q_4$ to ground potential turning it off. Subsequently, in approximately 2 microseconds, transistor $Q_1$ is turned off because it has been deprived of its base drive current. This results in the load being completely and rapidly disconnected from the source of power.

The second fault which can be detected with the current interrupter is that of excessive rate of rise of load current. This detection system derives its input signal from inductor $L_1$ in the sampling network. Rapid load current changes generate a voltage across inductor $L_1$ which is then sensed by comparator $A_1$. Comparator $A_1$, responding to a rapid voltage input across the sampling network, switches from low to high and the turn off sequence described above is again completed. The effects of d.c. overcurrent inputs and rate of load current rise inputs are additive.

Figure 6B:
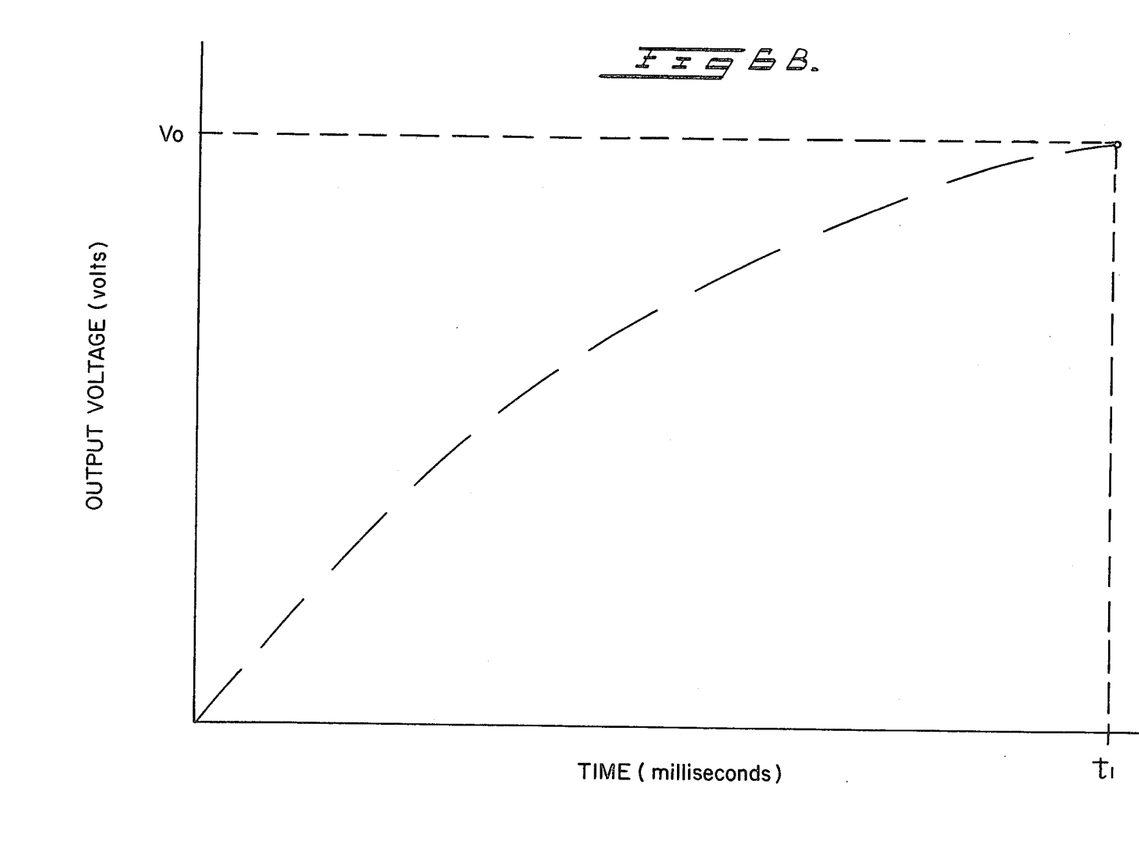
FIG. 6B is a graph of the output voltage (Vo) versus time.

FIG. 6A is a graph of the output voltage characteristic versus load current of the current interrupter shown in FIG. 5. The normal no-load voltage $V_o$ decreases slightly as the load current increases up to the maximum load current $I_{L(max)}$. If $I_{L(max)}$ is exceeded, transistor switch $Q_1$ of the current interrupter opens and causes the output voltage and load current to decrease to zero by the dotted path shown in approximately 2 microseconds. FIG. 6B shows the slow rise of the output voltage from zero to $V_o$ caused by the slow turn on characteristic of the current interrupter. Turn on to full output voltage $V_o$ requires approximately 1 millisecond.

Figure 7:
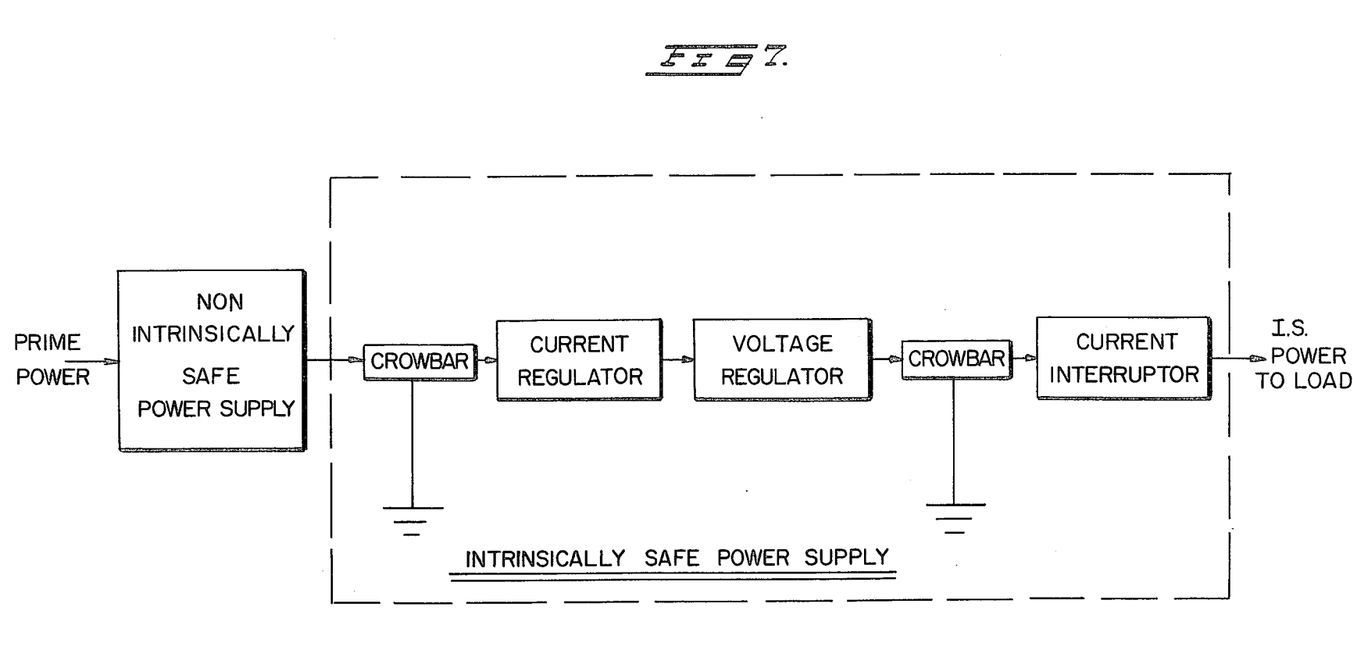
FIG. 7 illustrates a typical system set up with our intrinsically safe power supply used therewith.
Figure 8A:
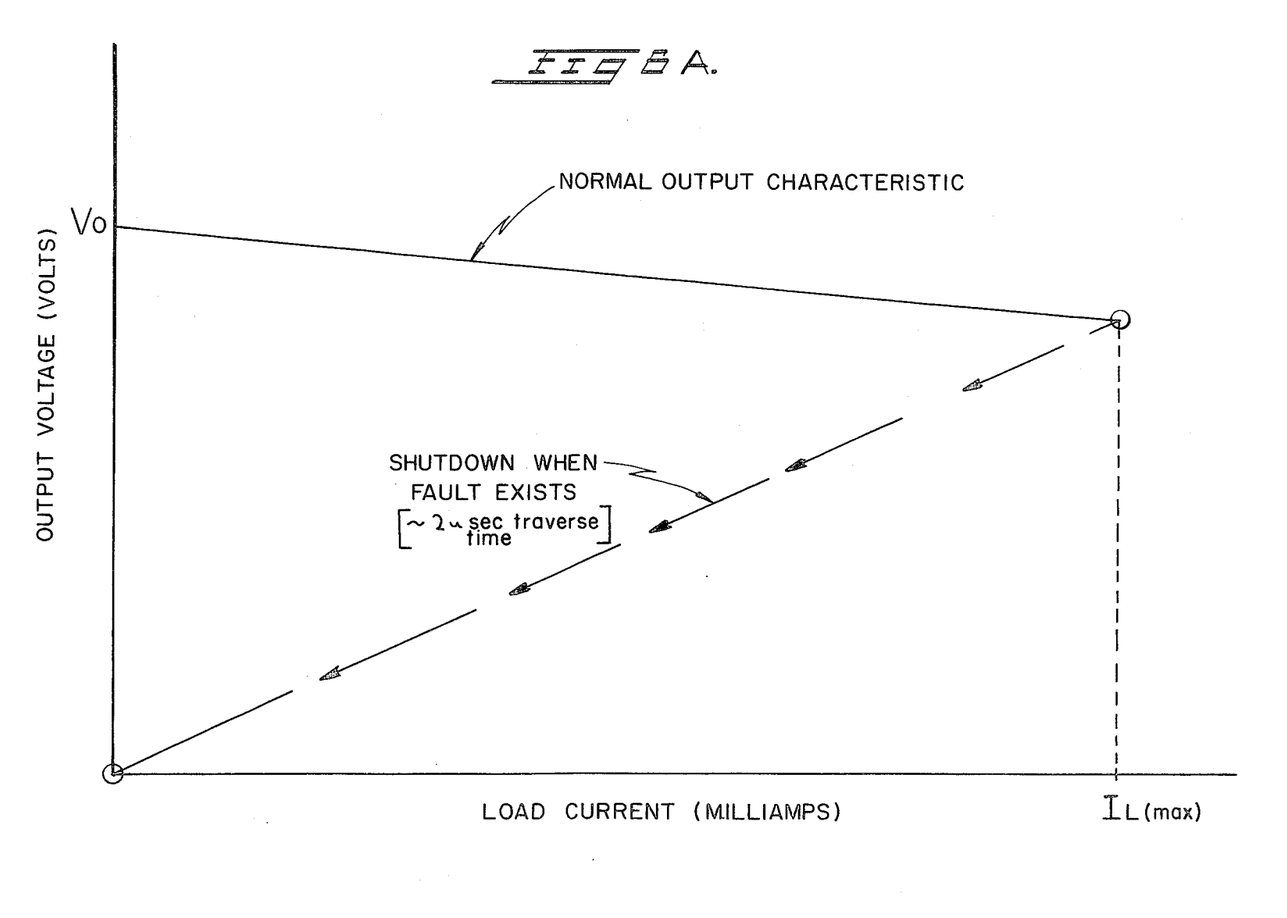

A typical system employing our intrinsically safe power supply is shown in FIG. 7. A standard laboratory type power supply is used to supply input power to the intrinsically safe power supply. Conventional silicon controlled rectifier crowbar circuits are used to guard against an overvoltage input from the nonintrinsically safe supply. The power is then current regulated and voltage regulated by circuits designed to minimize the energy stored in the regulator circuits, i.e., no large inductors or capacitors are employed in the regulating process. A second crowbar circuit guards aginst failure of the voltage regulation circuitry to limit the input voltage to the current interrupter to a safe level. The current interrupter now monitors the load current for its d.c. level and high rate of current rise conditions as described previously.

These five subsystems, as shown in FIG. 7, a crowbar circuit, current regulator circuit, voltage regulator circuit, a crowbar circuit, and a current interrupter circuit comprise the intrinsically safe power supply. In normal use, MSHA will require that the system be redundant to protect against circuit faults which may occur. To do this, the crowbar circuits may be made doubly redundant while the current regulator, voltage regulator, and current interrupter circuits may be made treble redundant.

Several advantages are presented by the binary nature of the described intrinsically safe power supply. First, when in an off mode no energy is delivered to the load. Thus, if the fault were in a thin strand of wire, this wire would not heat up to become a potential hot wire ignition source in a dangerous environment. Second, the reset signal $X_3$ is supplied internally from an oscillator as shown in the preferred embodiment of FIG. 4. Also, the reset signal could be timed out so that after a given number of reset pulses power would be permanently removed from the load until personnel investigate and override the permanent power removal source. Third, the modified power has the ability to respond faster than the prior art capacitive loads. This occurs because the pass transistor $Q_1$ is saturated when conducting and, therefore, does not have to dissipate as much heat as the prior art power supplies. This means a lower power rating can be used for transistor $Q_1$ with its inherently faster speed of response. Fourth, our overvoltage detection system, whether tripped at a given input or output voltage, can be adjusted as close to the "dangerous" level as desired. The intrinsically safe power supply detects d.c. load currents as well as the acts of change of the load current, thereby greatly increasing the sensitivity to dangerous load conditions. Lastly, after the voltage trips the circuit, the power supply does not have to be reset as with the use of crowbars alone.

Other variations and advantages to the described preferred embodiment are also possible. None should be used to change the scope and spirit of our invention which is to be limited only by the claims that follow.

We claim:

1. A binary controlled current interrupter circuit to safely control the supply of power to a remote electrically operated load located in an explosive atmosphere comprising:

input and output terminals for the interrupter, said output terminals being electrically connected to the load in the explosive atmosphere;

means to sense the current level rate of change between the interrupter's input and output terminals to output a signal should the detected current rate of change exceed a predetermined level;

means to sense the voltage level drop across a sampling section between the input and output terminals of the interrupter to output a signal should this level exceed a predetermined voltage level;

flip-flop switch means actuated by the output signal from either the current level rate of change means or the voltage sensing means to output a responsive signal;

delay means actuated by a signal from the flip-flop switch means for delaying the turn on of the load initially or after any subsequent interruptions of power thereto, said delay means providing for the turn off of power to the load several times more rapidly than its turn on of power; and a pass transistor switch means to control the signal output of the interrupter and response to the output signal from the flip-flop and delay means to cease the supply of electrical energy to the load should either the predetermined sensed circuit rate of change means or the voltage levels be reached.

2. The current interrupter of claim 1 wherein:

said means to sense the current level rate of change is an inductor;

said means to sense the voltage level drop is a resistive element in series with said inductor; and also including current comparator means operatively connected to the outputs from said inductor and resistive element.

3. The circuit of claim 2 further comprising a gating circuit connected between the outputs from the current comparator and the input to the flip-flop switch, said flip-flop being actuated by a gated signal from the comparator means.

4. The circuit of claim 3 including means to send a reset signal to the flip-flop switch so that it may be responsive to another signal from the gating circuit.

* * * * *